(12) United States Patent
Nobori

(10) Patent No.: US 9,854,213 B2
(45) Date of Patent: Dec. 26, 2017

(54) PROJECTOR AND LIGHT SOURCE CONTROL METHOD

(71) Applicant: SEIKO EPSON CORPORATION, Tokyo (JP)

(72) Inventor: Tatsuhiko Nobori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/392,635

(22) Filed: Dec. 28, 2016

(65) Prior Publication Data

US 2017/0208298 A1   Jul. 20, 2017

(30) Foreign Application Priority Data

Jan. 15, 2016 (JP) ................................ 2016-006183

(51) Int. Cl.
  *H04N 5/74* (2006.01)
  *G03B 21/26* (2006.01)
  *H04N 9/31* (2006.01)

(52) U.S. Cl.
  CPC ................................ *H04N 9/3155* (2013.01)

(58) Field of Classification Search
  CPC .................................................... G03B 21/26
  USPC ................................................ 348/744, 745
  See application file for complete search history.

(56) References Cited

U.S. PATENT DOCUMENTS

| 2005/0213045 A1* | 9/2005 | Taoka | G02B 26/0875 353/31 |
| 2006/0290625 A1* | 12/2006 | Sugimoto | G09G 3/3413 345/83 |
| 2007/0018951 A1 | 1/2007 | Nobori et al. | |
| 2009/0224136 A1* | 9/2009 | Ikegami | H05B 33/0851 250/205 |
| 2010/0214497 A1* | 8/2010 | Fujisaki | H04N 9/3105 348/751 |
| 2012/0327379 A1* | 12/2012 | Enomoto | G03B 21/16 353/52 |
| 2013/0010212 A1 | 1/2013 | Hino | |
| 2013/0050291 A1 | 2/2013 | Nobori et al. | |
| 2013/0088693 A1 | 4/2013 | Terashima et al. | |

(Continued)

FOREIGN PATENT DOCUMENTS

| JP | 2007041535 A | 2/2007 |
| JP | 2013-015696 A | 1/2013 |

(Continued)

*Primary Examiner* — Paulos M Natnael
(74) *Attorney, Agent, or Firm* — Oliff PLC

(57) ABSTRACT

A projector includes a light source portion; a light source control portion that controls an amount of light emitted by the light source portion; a feature amount acquisition portion that inputs image data and calculates an image feature amount of the input image data; an amount of light acquisition portion that acquires a set amount of light of the light source portion based on an image feature amount; a correction value acquisition portion that acquires a correction value based on the set amount of light; and an amount of light correction processing portion that corrects the set amount of light by using the correction value acquired by the correction value acquisition portion. The light source control portion controls the amount of light of the light source based on the set amount of light that is corrected by the amount of light correction processing portion.

16 Claims, 5 Drawing Sheets

(56) References Cited

U.S. PATENT DOCUMENTS

| | | | |
|---|---|---|---|
| 2014/0240808 A1* | 8/2014 | Yamamoto | G02B 26/101 |
| | | | 359/198.1 |
| 2014/0253527 A1* | 9/2014 | Ogi | G09G 5/02 |
| | | | 345/207 |
| 2015/0172591 A1 | 6/2015 | Nobori | |
| 2015/0172645 A1 | 6/2015 | Nobori | |
| 2017/0089758 A1* | 3/2017 | Okamoto | G01J 1/42 |

FOREIGN PATENT DOCUMENTS

| | | |
|---|---|---|
| JP | 2013050523 A | 3/2013 |
| JP | 2013-083714 A | 5/2013 |
| JP | 2015-118224 A | 6/2015 |
| JP | 2015-119312 A | 6/2015 |
| JP | 2015-145891 A | 8/2015 |

* cited by examiner

PROJECTOR AND LIGHT SOURCE CONTROL METHOD

CROSS-REFERENCE

The entire disclosure of Japanese Patent Application No. 2016-006183, filed Jan. 15, 2016 is expressly incorporated by reference herein.

BACKGROUND

1. Technical Field

The present invention relates to a projector and a light source control method.

2. Related Art

In the related art, a projector performing dimming processing for controlling a brightness of light emitted from a light source according to a luminance of an image that is displayed is known (for example, see JP-A-2007-41535). An image display device of JP-A-2007-41535 calculates an image feature amount indicating features of the luminance of image data that is displayed, determines dimming coefficient controlling a dimming element based on the calculated image feature amount, and controls the dimming element based on the determined dimming coefficient.

However, the amount of light emitted from the light source may vary due to an influence of a temperature or the like of the light source. In this case, the amount of the light emitted by the projector is a brightness to which both the characteristics of the light source and a variation due to the dimming are applied, and the amount of light may be unstable.

SUMMARY

An advantage of some aspects of the invention is to appropriately control an amount of light, which is output from a projector, in response to influences such as temperature characteristics of a light source or the like.

A projector according to an aspect of the invention includes a light source; a light source control portion that controls an amount of light emitted by the light source; an input portion that inputs image data; an amount of light acquisition portion that acquires a set amount of light of the light source based on a feature amount of the image data input into the input portion; a correction value acquisition portion that acquires a correction value based on the set amount of light; and a correction portion that corrects the set amount of light using the correction value acquired by the correction value acquisition portion. The light source control portion controls the amount of light of the light source based on the set amount of light that is corrected by the correction portion.

According to the aspect of the invention, the set amount of light of the light source acquired by the light amount acquisition portion is corrected by the correction value that is acquired by the correction value acquisition portion. Therefore, even in a case where the amount of light that is output by the light source varies due to influences of the temperature characteristics and the like, it is possible to appropriately control the amount of light that is output by the light source.

In the projector, the correction value acquisition portion may obtain the correction value corresponding to a temperature of the light source and characteristics of an output amount of light.

According to the aspect of the invention with this configuration, it is possible to correct the set amount of light of the light source acquired by the light amount acquisition portion by using the correction value corresponding to the temperature of the light source and the characteristics of the output amount of light. Therefore, it is possible to correct the set amount of light by using the correction value corresponding to the temperature characteristics of the light source and the like and to appropriately control amount of light output from the projector.

In the projector, the correction value acquisition portion may have a first coefficient for changing the correction value to a small value and a second coefficient for changing the correction value to a large value as coefficients for obtaining the correction value. One of the first coefficient and the second coefficient may be selected based on the set amount of light and the correction value may be obtained using the selected first coefficient or second coefficient.

According to the aspect of the invention with this configuration, the first coefficient or the second coefficient is selected based on the set amount of light acquired by the light amount acquisition portion and the correction value is obtained by using the selected first coefficient or second coefficient. Therefore, it is possible to select a coefficient for changing the correction value based on the set amount of light that is acquired by the light amount acquisition portion and to correct the correction value by the selected coefficient.

In the projector, the correction value acquisition portion may apply the first coefficient to the correction value that is already obtained by the correction value acquisition portion and then may obtain a correction value in a case where the set amount of light is equal to or less than a first threshold value, and may apply the second coefficient to the correction value that is already obtained by the correction value acquisition portion and then may obtain a correction value in a case where the set amount of light is equal to or greater than a second threshold value.

According to the aspect of the invention with this configuration, the correction value that is already obtained by the correction value acquisition portion is corrected by applying the first coefficient or the second coefficient that is selected based on the set amount of light. Therefore, it is possible to control a rapid variation in a brightness of an image by appropriately correcting the correction value.

In the projector, the correction value acquisition portion may select the correction value that is already obtained by the correction value acquisition portion as the correction value for correcting the set amount of light in a case where the set amount of light is greater than the first threshold value and less than the second threshold value.

According to the aspect of the invention with this configuration, the correction value that is already obtained by the correction value acquisition portion is selected as the correction value in a case where the set amount of light is greater than the first threshold value and is less than the second threshold value. Therefore, it is possible to control a rapid variation in the brightness of the image by selecting an appropriate value as the correction value.

In the projector, the first coefficient may be a coefficient corresponding to decrease characteristics of the temperature of the light source and the second coefficient may be a coefficient corresponding to increase characteristics of the temperature of the light source.

According to the aspect of the invention with this configuration, it is possible to correct the set amount of light that is acquired by the light amount acquisition portion by a coefficient corresponding to the increase characteristics or the decrease characteristics of the temperature of the light source. Therefore, it is possible to correct the set amount of light by using the correction value corresponding to the temperature characteristics of the light source and to appropriately control the amount of light that is output by the projector.

In the projector, the correction value acquisition portion may change the correction value to a value that is set in advance in a case where predetermined conditions are satisfied.

According to the aspect of the invention with this configuration, the correction value is changed to a value that is set in advance in a case where the predetermined conditions are satisfied. Therefore, it is possible to correct the correction value to a value corresponding to the temperature variation of the light source even in a case where the temperature of the light source is rapidly varied.

In the projector, the correction value acquisition portion may obtain the correction value based on an average value of the set amount of light.

According to the aspect of the invention with this configuration, the correction value is set based on the average value of the set amount of light. Therefore, it is possible to set the correction value to an appropriate value by reducing an influence of a rapid variation in image data.

The projector may further include an extension rate calculation portion that calculates an extension rate to be used for luminance extension processing that changes a luminance range of image data based on the characteristic amount of the image data input into the input portion, and an extension processing portion that performs the luminance extension processing with respect to the image data using the extension rate that is calculated by the extension rate calculation portion.

According to the aspect of the invention with this configuration, it is possible to perform the extension processing for extending the luminance range of the image data.

The projector may further include a storage portion that stores the correction value. The correction value acquisition portion may acquire the correction value corresponding to the set amount of light from the storage portion.

According to the aspect of the invention with this configuration, it is possible to acquire the correction value corresponding to the set amount of light from the storage portion. Therefore, it is possible to reduce time and effort for calculating the correction value.

A light source control method according to another aspect of the invention is a light source control method for controlling an amount of light of a light source provided in a projector, the method including acquiring a set amount of light of the light source based on a feature amount of input image data; acquiring a correction value based on the set amount of light; correcting the set amount of light by using the correction value; and controlling an amount of light of the light source based on the corrected set amount of light.

According to the aspect of the invention, the set amount of light of the light source is acquired, the correction value is acquired based on the acquired set amount of light, and the set amount of light is corrected based on the acquired correction value. Therefore, it is possible to appropriately control the amount of light that is output by the projector in response to influences of the temperature characteristics of the light source and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
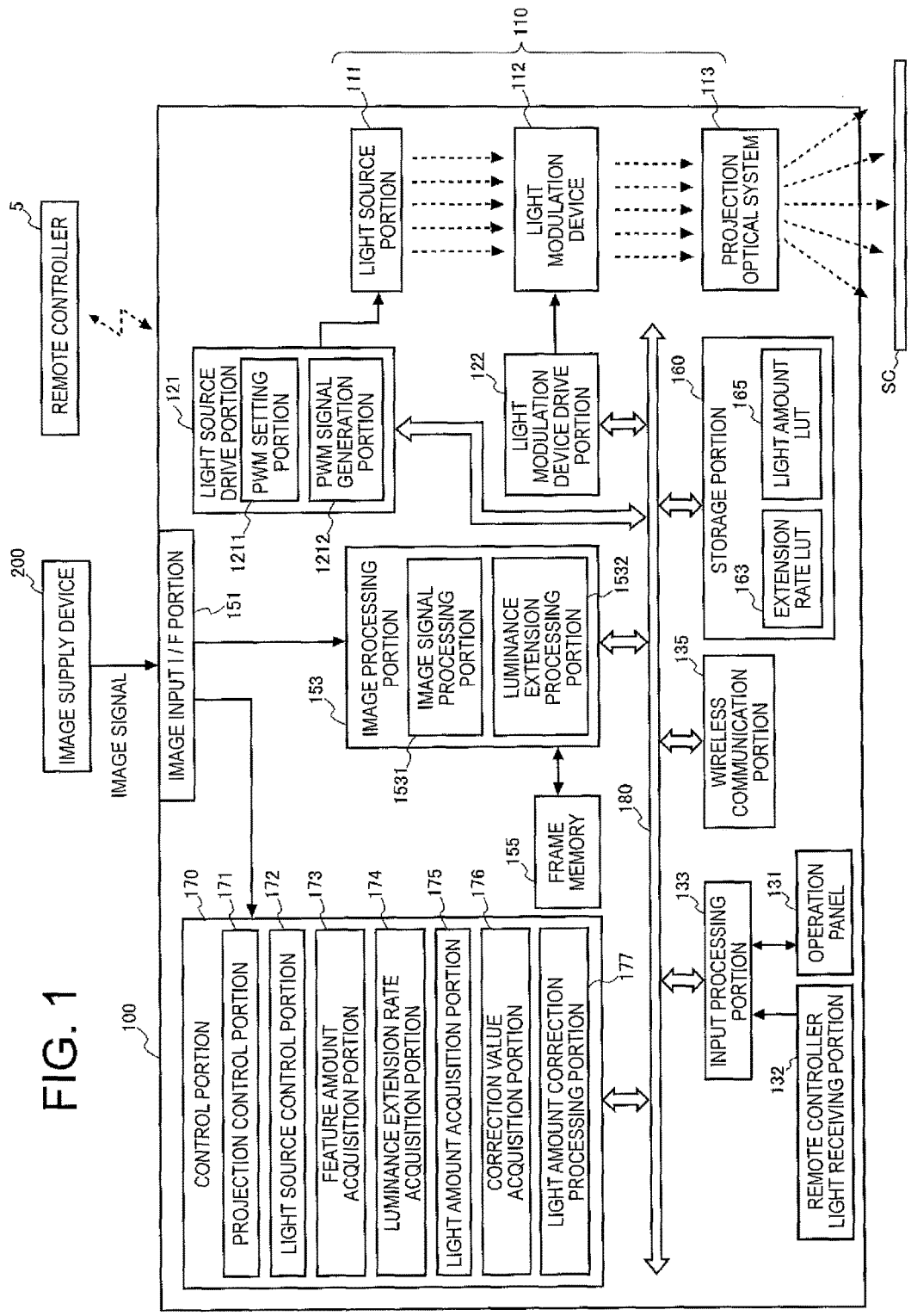
FIG. 1 is a block diagram illustrating a configuration of a projector.

FIG. 1 is a block diagram illustrating a configuration of a projector 100 of the first embodiment.

The projector 100 is an apparatus that is connected to an external image supply device 200 such as a personal computer or various video players and projects an image video to a projection object based on an image signal supplied from the image supply device 200.

As the image supply device 200, it is possible to use a video output device such as a video reproducing device, a Digital Versatile Disk (DVD), a video tuner device, a set-top box of a Cable television (CATV), and a video game device, a personal computer, and the like.

In addition, a projection object may be an object that is not uniformly flat such as a building or an object, or may be an object having a flat projection surface such as a screen SC or a wall surface of a building. In the embodiment, a case of projecting on the screen SC of a plane is exemplified.

The projector 100 includes an image input interface portion (hereinafter, substantially referred to as image input I/F portion) 151 as an interface connected to the image supply device 200.

The image input I/F portion 151 includes a connector and an interface circuit (neither illustrated) connecting a cable, and inputs an image signal supplied from the image supply device 200 that is connected via the cable. The image input I/F portion 151 converts an input image signal into image data (hereinafter, referred to as image data D1) and outputs the image data D1 to an image processing portion 153.

The interface included in the image input I/F portion 151 may be, for example, an interface for data communication such as an Ethernet (registered trademark), an IEEE 1394, and a USB. In addition, the interface of the image input I/F portion 151 may be an interface for image data such as an MHL (registered trademark), an HDMI (registered trademark), and a Display Port.

In addition, the image input I/F portion 151 may be configured to include a VGA terminal into which an analogue video signal is input or a Digital Visual Interface (DVI) terminal into which digital video data is input as a connector. Furthermore, the image input I/F portion 151 includes an A/D conversion circuit and, in a case where an analogue video signal is input via a VGA terminal, converts the analog video signal into the image data D1 using the A/D conversion circuit, and outputs the image data D1 to the image processing portion 153.

The projector 100 roughly includes a display portion 110 that performs formation of an optical image and an image processing system electrically processing an image that is displayed by the display portion 110.

First, the display portion 110 will be described. The display portion 110 includes a light source portion 111, alight modulation device 112, and a projection optical system 113. The light source portion 111 corresponds to the "light source" according to the invention.

The light source portion 111 includes a solid-state light source that can PWM-controls a luminance by a pulse signal. As the solid-state light source, it is possible to use a light emitting element such as a Light Emitting Diode (LED) or a laser element. The light source portion 111 may be configured to include an optical scanning element performing scanning of light emitted from the solid-state light source (hereinafter, simply referred to as a light source) or a lens group for increasing optical characteristics of the emitted light.

The light source portion 111 is driven by a light source drive portion 121. The light source drive portion 121 includes a Pulse Width Modulation (PWM) setting portion 1211 and a PWM signal generation portion 1212, and is connected to an internal bus 180.

The light source drive portion 121 controls a light source driver (not illustrated) and controls of the PWM of the light source of the light source portion 111 according to a control signal input from a control portion 170. Therefore, turning on and turning off of the light source are controlled and dimming of the light source for adjusting an amount of light of the light source is executed.

The PWM setting portion 1211 generates a PWM frequency signal for specifying a pulse frequency and an ON-period specifying signal for specifying a pulse width according to the control signal input from the control portion 170, and outputs the signals to the PWM signal generation portion 1212. The PWM signal generation portion 1212 generates a PWM signal having a pulse for turning on the light source according to the PWM frequency signal and the ON-period specifying signal input from the PWM setting portion 1211, and outputs the signals to the light source driver.

The light modulation device 112 is driven by a light modulation device drive portion 122 which is described below and generates and outputs an image light by modulating light emitted by the light source portion 111.

As a specific configuration of the light modulation device 112, for example, it is configured by a method using a type using three transmissive or reflective liquid crystal light valves corresponding to each color of red (hereinafter, referred to as R), green (hereinafter, referred to as G), and blue (hereinafter, referred to as B). In addition, the light modulation device 112 maybe configured by a method using three digital mirror devices (DMD). In addition, the light modulation device 112 may also employ a DMD method in which a color wheel into which lights of RGB among lights included in a white light emitted by the light source portion 111 are transmitted and one digital mirror device are combined. In the embodiment, the light modulation device 112 includes three liquid crystal light valves respectively corresponding to three color lights of RGB. Each liquid crystal light valve includes a liquid crystal panel in which a liquid crystal is sealed between a pair of transparent substrates.

The light modulation device 112 is driven by the light modulation device drive portion 122. The light modulation device drive portion 122 is connected to the internal bus 180.

The light modulation device drive portion 122 drives the light modulation device 112 based on a display image signal that is input from the image processing portion 153 that is described below, applies a drive voltage in response to a display image signal to each pixel of a liquid crystal panel, and controls a light transmittance of each pixel. Therefore, light emitted from the light source portion 111 is modulated to an image light. Image lights of RGB that are modulated by the light modulation device 112 are respectively combined by a cross dichroic prism (not illustrated) and are guided to the projection optical system 113.

The projection optical system 113 includes a lens group (not illustrated) for projecting the image light generated by the light modulation device 112 to a screen SC to be imaged. In addition, the projection optical system 113 drives the lens group using a motor (not illustrated) and performs adjustment such as zooming, focusing, and throttling.

An operation panel 131 including various switches that are operated by a user and indicator lamps are disposed in a body of the projector 100. The operation panel 131 is connected to an input processing portion 133. The input processing portion 133 turns on or turns off the indicator lamps of the operation panel 131 in accordance with an operation state or a setting state of the projector 100 according to the control of the control portion 170. When a switch of the operation panel 131 is operated, an operation signal corresponding to the operated switch is output from the input processing portion 133 to a control portion 170.

In addition, the projector 100 has a remote controller 5 that is used by the user. The remote controller 5 includes various buttons and transmits infrared signals in response to the operations of these buttons. A remote controller light receiving portion 132 for receiving the infrared signal emitted by the remote controller 5 is disposed in a body of the projector 100. The remote controller light receiving portion 132 decodes the infrared signal that is received from the remote controller 5, generates an operation signal indicating an operation content in the remote controller 5, and outputs the operation signal to the control portion 170.

The projector 100 includes a wireless communication portion 135. The wireless communication portion 135 is connected to the internal bus 180. The wireless communication portion 135 includes an antenna, a Radio Frequency (RF) circuit (not illustrated), and the like, and executes the wireless communication with an external device under the control of the control portion 170. For example, as a wireless communication system of the wireless communication portion 135, it is possible to employ a short-distance wireless communication system such as wireless Local Area Network (WLAN), a Bluetooth (registered trademark), Ultra Wide Band (UWB), and an infrared communication, or a wireless communication system using a portable telephone network.

The image processing system of the projector 100 is mainly configured of the control portion 170 controlling the projector 100 and further includes the image processing portion 153, a frame memory 155, and a storage portion 160. The control portion 170, the image processing portion 153, and the storage portion 160 are connected to the internal bus 180.

The image processing portion 153 includes an image signal processing portion 1531 and a luminance extension processing portion 1532. The image signal processing portion 1531 develops the image data D1 input from the image input I/F portion 151 to the frame memory 155 and executes image processing with respect to the developed image data D1 according to the control of the control portion 170. The image processing that is executed by the image signal processing portion 1531 includes, for example, resolution conversion (scaling) processing, frame rate conversion processing, shape correction processing, zoom processing, color correction processing, luminance correction processing, and the like. In addition, of course, it is possible to execute a combination of a plurality of types of processing among them.

The resolution conversion processing is processing in which the image signal processing portion 1531 converts the resolution of the image data D1 in accordance with a resolution that is designated by the control portion 170, for example, a display resolution of a liquid crystal panel that is included in the light modulation device 112. The frame rate conversion processing is processing in which the image signal processing portion 1531 converts a frame rate of the image data D1 into a frame rate that is designated by the control portion 170.

The shape correction processing is processing in which the image signal processing portion 1531 converts the image data D1 and corrects a shape of an image projected on the screen SC in accordance with correction parameters that are input from the control portion 170.

The zoom processing is processing in which the image signal processing portion 1531 performs enlarging/reducing of the image in a case where zooming is instructed by the operation of the remote controller or the operation panel.

The color correction processing is processing for converting of the color of the image data and the image signal processing portion 1531 changes data of each pixel included in the image data D1 in accordance with a color that is designated by the control portion 170. In the processing, the projector 100 can realize a color that is suitable for watching movies, a color that is suitable for a case where the screen SC is placed in a bright environment, a color that is suitable for a case where the image is projected on a non-white screen SC such as a blackboard, and the like. Contrast adjustment and the like may be performed in addition to the color correction processing.

The luminance correction processing is processing in which the image signal processing portion 1531 corrects the luminance of the image data D1 in response to a light emitting state of the light source portion 111, the brightness of the environment in which the projector 100 is placed, and the like.

Contents of the processing executed by the image signal processing portion 1531, the parameters, and timing of a start and completion of the processing, are controlled by the control portion 170.

The image signal processing portion 1531 reads image data (hereinafter, referred to as image data D2) in which the image processing described above is executed from the frame memory 155 and is transmitted to the control portion 170 via the internal bus 180. In addition, the image signal processing portion 1531 generates the display image signal of R, G, and B corresponding to the read image data D2 and outputs the display image signal to the luminance extension processing portion 1532.

The luminance extension processing portion 1532 performs processing (referred to as luminance extension processing) for enlarging the luminance range of the display image signal with respect to the display image signal that is input from the image signal processing portion 1531. The luminance extension processing portion 1532 corresponds to the "extension processing portion" according to the invention.

The luminance extension processing portion 1532 extends the luminance of the display image signal at an extension rate that is designated by the control portion 170. A contrast of an image that is displayed on the screen SC is improved by the processing. The extension rate indicates a gain that is used for the conversion of the luminance of the image data D2.

The luminance extension processing portion 1532 outputs the display image signal in which the luminance extension processing is performed to the light modulation device drive portion 122. The light modulation device drive portion 122 drives the liquid crystal panel of the light modulation device 112 based on the display image signal in which the processing is performed by the luminance extension processing portion 1532 and thereby an image light in which the luminance range is extended is displayed on the liquid crystal panel.

The storage portion 160 is configured of a nonvolatile memory such as a flash memory and an EEPROM. The storage portion 160 stores data that is processed by the control portion 170 or a control program that is executed by the control portion 170 in a nonvolatile manner. In addition, the storage portion 160 stores setting values of various types of processing which are executed by the image processing portion 153 or tables which are referred by the control portion 170. In the embodiment, as the tables which are referred by the control portion 170, an extension rate Look-up Table (LUT) 163 and a light amount LUT 165 are stored. Details of the tables will be described later.

In addition, it is also possible to store image data supplied from the outside to the storage portion 160. If a display request of the image data stored in the storage portion 160 is received by the operation panel 131 or the remote controller 5, the control portion 170 reads the image data that is display-requested from the storage portion 160 and outputs the image data to the image processing portion 153.

The control portion 170 includes hardware such as a CPU, a ROM, a RAM (not illustrated), and the like. The ROM is a nonvolatile storage device such as a flash ROM and stores a control program or data. The RAM configures a work area of the CPU. The CPU develops a control program that is read from the ROM or the storage portion 160 to the RAM, executes the control program developed in the RAM, and controls each portion of the projector 100.

In addition, the control portion 170 includes a projection control portion 171, a light source control portion 172, a feature amount acquisition portion 173, a luminance extension rate acquisition portion 174, a light amount acquisition portion 175, a correction value acquisition portion 176, and a light amount correction processing portion 177 as functional blocks. The functional blocks are realized by executing the control program stored in the ROM or the storage portion 160 by the CPU.

The projection control portion 171 adjusts a display mode of an image in the display portion 110 and executes the projection of an image to the screen SC.

Specifically, the projection control portion 171 controls the image processing portion 153 and executes the image processing with respect to the image data D1 that is conveyed by the image input I/F portion 151. In this case, the projection control portion 171 reads parameters that are required in the processing performed by the image processing portion 153 from the storage portion 160 and may output the parameters to the image processing portion 153.

The light source control portion 172 generates a control signal for controlling the light source drive portion 121 and outputs the control signal to the light source drive portion 121. The control signal is a signal that is used for generation of a PWM signal that is used when the light source drive portion 121 drives the light source portion 111 and, for example, includes information for designating a pulse frequency or a pulse width of the PWM signal.

The functional blocks other than the projection control portion 171 and the light source control portion 172 will be described with reference to FIGS. 2 and 3.

Figure 2:
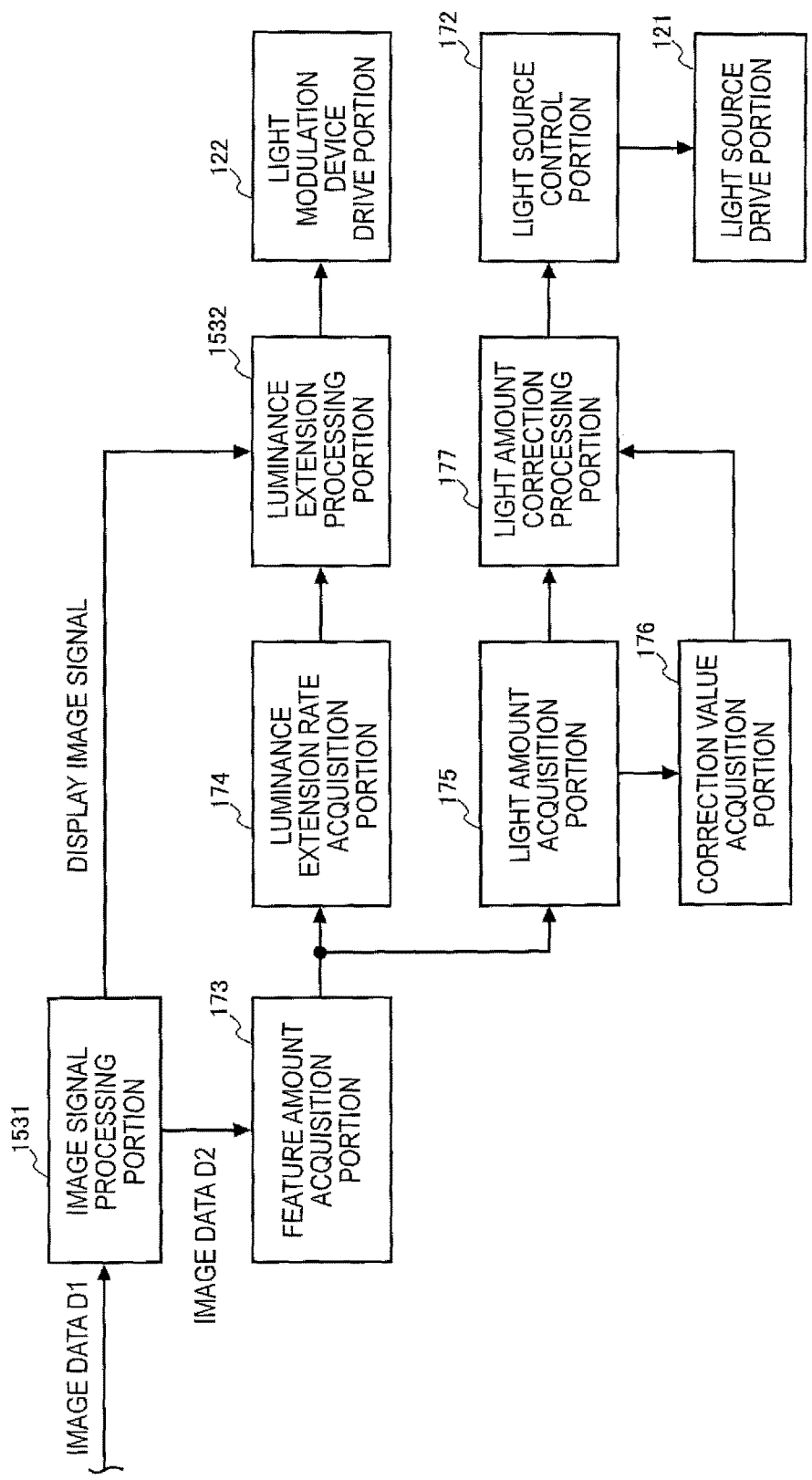
FIG. 2 is a diagram schematically illustrating a function of the projector.
Figure 3:
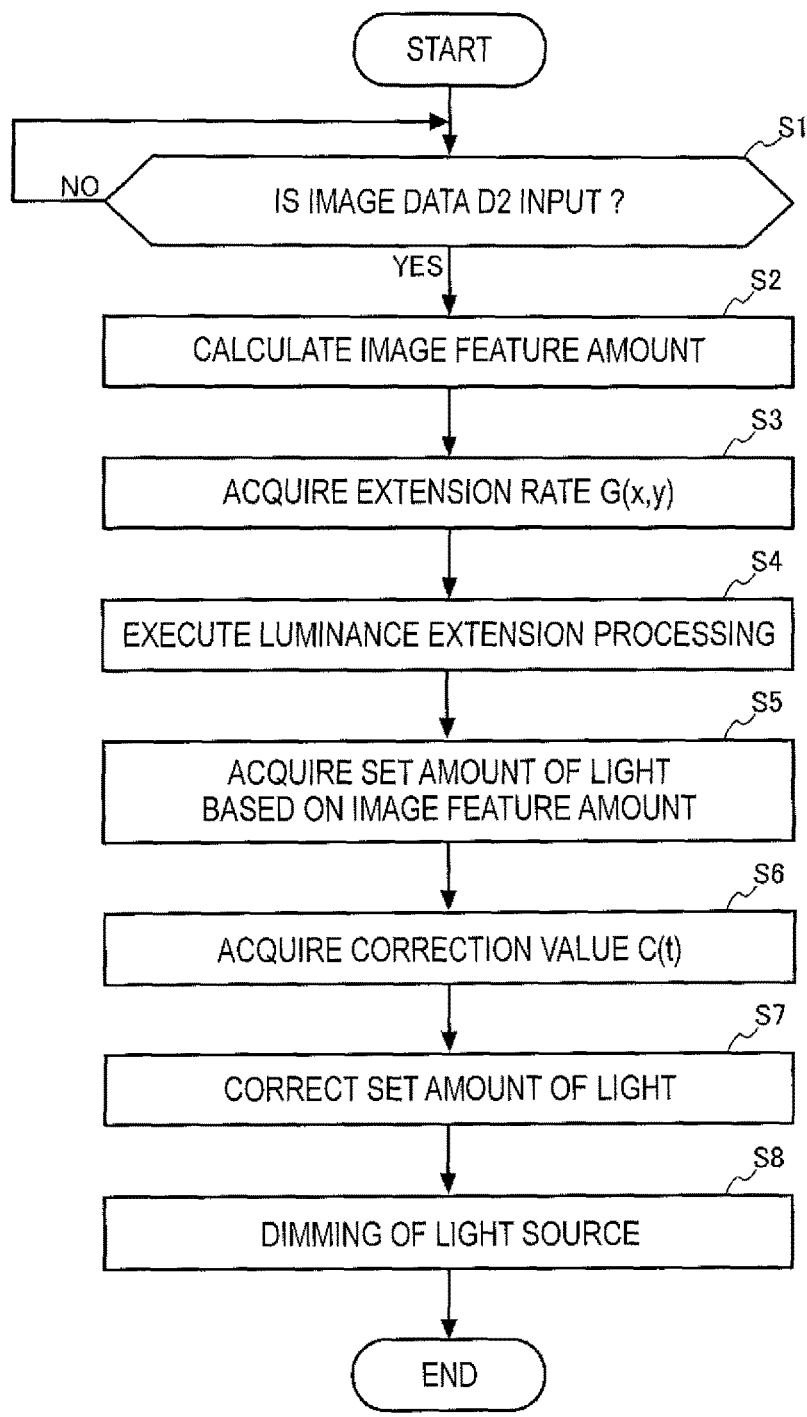
FIG. 3 is a flowchart illustrating an operation of the projector.

FIG. 2 is a diagram schematically illustrating the function of the projector 100. In addition, FIG. 3 is a flowchart illustrating the operation of the control portion 170 and the image processing portion 153.

If the image supply device 200 starts the supply of the image signal and the image signal is input from the image supply device 200, the projector 100 converts the input image signal into the image data D1 in the image input I/F portion 151 and outputs the image data D1 to the image processing portion 153.

The image processing portion 153 performs the image processing of the input image data D1 in the image signal processing portion 1531. The image signal processing portion 1531 reads the image data D2 that is image-processed from the frame memory 155 and outputs the image data D2 to the control portion 170. In addition, the image signal processing portion 1531 generates the display image signal of R, G, and B corresponding to the read image data D2 and outputs the display image signal to the luminance extension processing portion 1532.

The image signal processing portion 1531 may output luminance data indicating the luminance of each pixel configuring the image data D2 in place of the image data D2 to the control portion 170. Data amount of the luminance data is smaller than a data amount of the image data and thereby it is possible to reduce a processing load of the control portion 170.

The image data D2 that is output from the image signal processing portion 1531 is input into the feature amount acquisition portion 173 of the control portion 170. The feature amount acquisition portion corresponds to the "input portion" according to the invention.

In a case where the image data D2 is not input from the image signal processing portion 1531 (step S1/NO), the feature amount acquisition portion 173 waits until the image data D2 is input. In addition, if the image data D2 is input (step S1/YES), the feature amount acquisition portion 173 calculates an image feature amount from the input image data D2 (step S2). The image feature amount corresponds to the "feature amount" according to the invention.

The image feature amount that is acquired by the feature amount acquisition portion 173 is, for example, a parameter indicating the brightness of the image such as a maximum luminance value, a minimum luminance value, an Average Picture Level (APL), and a luminance histogram in the image. The feature amount acquisition portion 173 may acquire other feature amounts as the image feature amounts.

In the flow, a case where the feature amount acquisition portion 173 calculates an APL value and a white peak value WP as the image feature amounts will be described. A luminance Y of one pixel of the image data D2 is, for example, defined by the following formula (1) or formula (2).

$$Y=0.299R+0.587G+0.144B \quad (1)$$

$$Y=\max(R,G,B) \quad (2)$$

Figure 4:
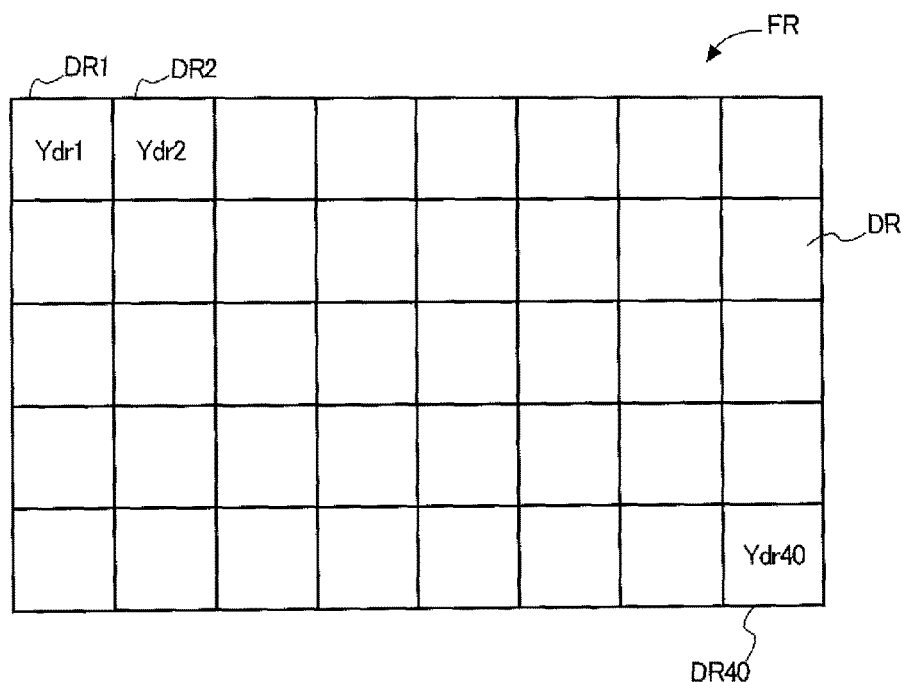
FIG. 4 is an explanatory view illustrating processing of a feature amount acquisition portion.

FIG. 4 is an explanatory view illustrating the processing of the feature amount acquisition portion 173.

First, the feature amount acquisition portion 173 divides one frame FR of the image data D2 into, for example, small regions DR of 32×32 pixels. FIG. 4 illustrates an example in which one frame FR is divided into 40 small regions DR1 to DR40. Among 40 small regions DR1 to DR40, if the luminance of each pixel within arbitrary i-th small region DRi is indicated by Yi1 to Yi1024, a representative luminance Ydri of the small region DRi is indicated by the following formula (3).

$$Ydri=(Yi1+Yi2+\ldots+Yi1024)/1024 \quad (3)$$

The representative luminance Ydri of the small region DRi is an average value of the luminance of each pixel within the small region DRi. The feature amount acquisition portion 173 obtains each of the representative luminance Ydr1 to Ydr40 of the small regions DR1 to DR40 using the formula (3). Therefore, the feature amount acquisition portion 173 causes the average value of the representative luminance Ydr1 to Ydr40 to be the APL value and the maximum value of the representative luminance Ydr1 to Ydr40 to be the white peak value WP. Here, the APL value and the white peak value WP are data that is expressed in 10 bits. Moreover, a size and the number of the small regions DR may be set arbitrary.

The feature amount acquisition portion 173 outputs the obtained image feature amount to the luminance extension rate acquisition portion 174 and the light amount acquisition portion 175.

The luminance extension rate acquisition portion 174 refers the extension rate LUT 163 based on the image feature amount that is input from the feature amount acquisition portion 173 and acquires the extension rate for each pixel configuring the image data D2 (step S3). The extension rate that is acquired by the luminance extension rate acquisition portion 174 is written as G(x,y) in the following description. The luminance extension rate acquisition portion 174 corresponds to the "extension rate calculation portion" according to the invention.

Here, a case where the luminance extension rate acquisition portion 174 acquires the extension rate G(x, y) for each pixel configuring the image data D2 is described, but the extension rate may be acquired for each of the small regions DR1 to DR40 described above. Letters x and y in the parentheses of the extension rate G(x, y) indicate coordinates in one frame of the image data D2. That is, G(x,y) means the extension rate of a pixel of coordinates (x,y). In addition, a range of the extension rate G(x,y) may be set arbitrary and, for example, is set to a range of 0 to 255. The luminance extension rate acquisition portion 174 outputs the acquired extension rate G(x,y) to the luminance extension processing portion 1532 of the image processing portion 153.

Figure 5:
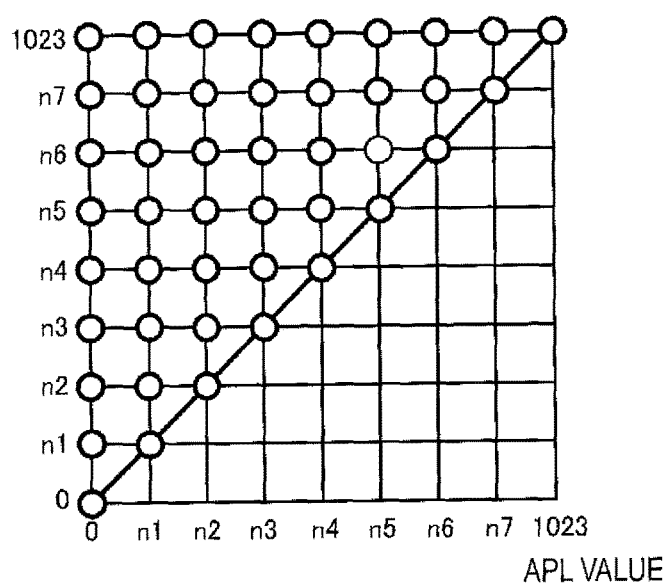
FIG. 5 is an explanatory view illustrating an example of an extension rate LUT.

FIG. 5 is an explanatory view illustrating an example of the extension rate LUT 163.

The extension rate LUT 163 of FIG. 5 is a table in which the extension rate is set in association with the APL value and the luminance peak value. The extension rate G(x,y) is stored in each location of grid points indicated by white circles in FIG. 5. The luminance extension rate acquisition portion 174 specifies the grid point corresponding to the APL value and the white peak value WP that are input as the image feature amounts and acquires the extension rate G(x,y) that is set in the specified grid point. In addition, in a case where the grid point corresponding to the APL value and the white peak value WP that are input as the image feature amounts does not exist in the extension rate LUT 163, the luminance extension rate acquisition portion 174 may also acquire the extension rate that is set in a grid point close to the APL value and the white peak value WP that are input. In addition, the luminance extension rate acquisition portion 174 performs an interpolation calculation and may obtain the extension rate based on the extension rate that is set in the three or four grid points.

In addition, since the APL value does not exceed the white peak value WP, the extension rate G(x,y) is not stored in the grid points of a lower right half of the extension rate LUT 163. Therefore, it is possible to reduce a memory amount.

The luminance extension processing portion 1532 performs the luminance extension processing that enlarges the luminance range of the display image signal that is input from the image signal processing portion 1531 with the extension rate G(x,y) designated by the control portion 170 (luminance extension rate acquisition portion 174) (step S4). The luminance extension processing portion 1532 outputs the display image signal in which the luminance extension processing is performed to the light modulation device drive portion 122. The light modulation device drive portion 122 drives the liquid crystal panel of the light modulation device 112 based on the display image signal that is processed by the luminance extension processing portion 1532 and thereby an image light in which the luminance range is extended is displayed in the liquid crystal panel that is included in the light modulation device 112.

The light amount acquisition portion 175 refers the light amount LUT 165 based on the image feature amount that is input from the feature amount acquisition portion 173 and acquires an amount of light (hereinafter, referred to as a set amount of light) that is set in the light source portion 111 for each frame of the image data D2 (step S5). Similar to the extension rate LUT 163, the light amount LUT 165 is a table that stores a set amount of light (hereinafter, written as K(t)) in each location of the grid point corresponding to the APL value and the luminance peak value.

The light amount acquisition portion 175 calculates an average value of the APL value and the white peak value WP that are input from the feature amount acquisition portion 173 as the image feature amount for each frame of the image data D2. The light amount acquisition portion 175 specifies the grid point of the light amount LUT 165 corresponding to the average value of the calculated APL value and the average value of the white peak value WP, and acquires the set light amount K(t) that is set in the specified grid point. A variable "t" is a variable for distinguishing the set amount of light that is acquired by the light amount acquisition portion 175. For example, the set amount of light that is acquired by the light amount acquisition portion 175 is written as K(t) and a set amount of light that is acquired one before the set light amount K(t) is written as K(t−1).

The light amount acquisition portion 175 outputs the acquired set light amount K(t) to the correction value acquisition portion 176 and the light amount correction processing portion 177.

The correction value acquisition portion 176 acquires a correction value for correcting the set light amount K(t) based on the set light amount K(t) that is input from the light amount acquisition portion 175 (step S6).

In some cases, a light source of the light source portion 111 is configured such that an output characteristic may be varied and the amount of the light that is output may be varied by a temperature. For example, since the temperature of the light source is low immediately after an actuation of the projector 100, the amount of light emitted from the light source may not become a desired amount of light. In addition, an amount of light equal to or greater than a predetermined amount may be output depending on the light source and may become a cause of light source failure. Therefore, even if the light source drive portion 121 drives the light source portion 111 based on the set light amount K(t) that is calculated by the image feature amount of the image data D2, the amount of light emitted from the light source of the light source portion 111 may not be stable.

Therefore, in the embodiment, the correction value acquisition portion 176 calculates a correction value for correcting the set light amount K(t) based on the set light amount K(t) that is acquired by the light amount acquisition portion 175 and the set light amount K(t) is corrected by using the correction value that is calculated by the light amount correction processing portion 177.

Figure 6:
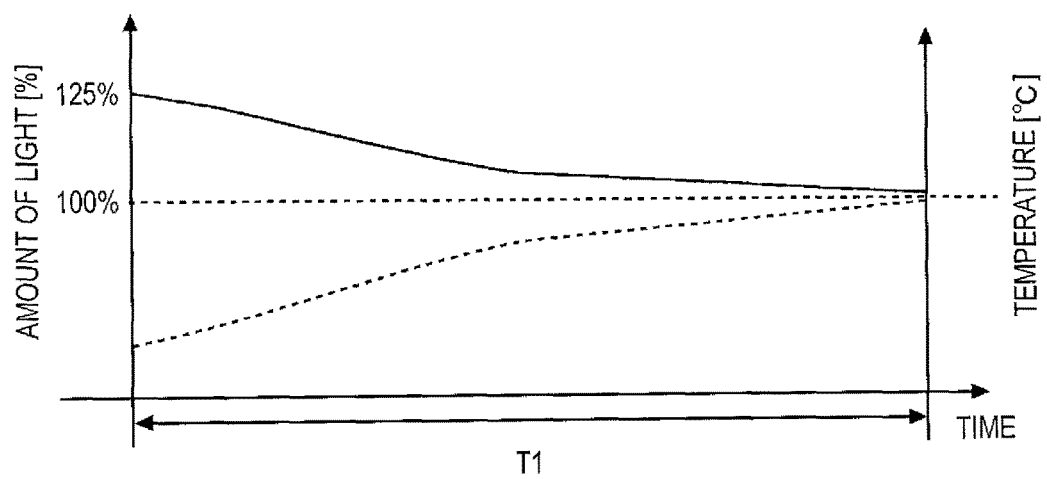
FIG. 6 is a diagram illustrating a variation in an output characteristic due to a temperature variation of a light source of a light source portion.

FIG. 6 is a diagram illustrating a variation in an output amount of light due to a temperature variation of the light source included in the light source portion 111, that is, temperature characteristics of the light source. A horizontal axis of FIG. 6 indicates an elapsed time from actuating the projector 100 and turning on the light source portion 111. A vertical axis of FIG. 6 indicates the output amount of light (%) of the light source and the temperature (° C.) of the light source portion 111. In addition, the variation in the output amount of light of the light source is indicated by a solid line and the variation in the temperature of the light source is indicated by a broken line in FIG. 6. The output amount of light indicates an amount of light that is actually output from the light source.

An amount of light of the light source is 100% when the projector 100 is actuated, the light source is turned on by setting of a brightness (luminance) set of the light source portion 111 to a maximum, and the temperature of the light source is in an equilibrium state. The equilibrium state refers to a state in which a temperature variation of the light source is within a predetermined range even if a temperature increase and a temperature decrease of the light source are balanced by a heating amount emitted by the light source and a time that is set in advance is elapsed. In addition, a time from turning on the light source portion 111 by activating the projector 100 to a state where the temperature of the light source becomes the equilibrium state is referred to as T1. Furthermore, the luminance of the light source is 125% when the projector 100 is actuated and the temperature of the light source immediately after the turning on of the light source portion 111 is sufficiently low.

In addition, an elapsed time from a state where setting of the brightness of the light source portion 111 to a maximum and the temperature of the light source is in the equilibrium state to a state where the light source portion 111 is turned off and the temperature of the light source is sufficiently low is referred to as T2. A state where the temperature of the light source portion 111 is sufficiently low refers to a state where the temperature decrease of the light source portion 111 is within a predetermined range in a time that is set in advance.

In the light source having the temperature characteristics illustrated in FIG. 6, the amount of light is increased if the temperature is lowered more than the temperature of the equilibrium state (100% amount of light). In a solid-state light source, a light emitting efficiency is improved and the output amount of light is increased as a temperature of the solid-state light source is lowered. Since the temperature of the light source is low immediately after the projector 100 is actuated and the light source portion 111 is turned on, the output amount of light of the light source is increased more than the equilibrium state. Therefore, the correction value acquisition portion 176 calculates a correction value for correcting the set light amount K(t) that is set by the light amount acquisition portion 175 to the set light amount K(t) that is much lower in a case where it is determined that the temperature of the light source portion 111 is lower than the temperature of the light source portion 111 in the equilibrium state. A correction value that is calculated by the correction value acquisition portion 176 is written as C(t).

In the embodiment, the maximum value of the correction value is "1.0" and the minimum value of the correction value is "0.8". Since the output amount of light of the light source is 125% in a state where the temperature of the light source is sufficiently lower immediately after the light source portion 111 is turned on, a correction value "0.8" (=100/125) for correcting the amount of light of 125% to 100% is used as the minimum value of the correction value C(t). In addition, the correction value acquisition portion 176 selects "1.0" as the correction value C(t) and thereby the amount of light of the light source portion 111 is set based on the set amount of light that is acquired by the light amount acquisition portion 175.

The correction value acquisition portion 176 obtains the correction value C(t) by using a first coefficient (hereinafter, written as r1) and a second coefficient (hereinafter, written as r2). The first coefficient r1 is a coefficient corresponding to the decrease characteristics of the temperature of the light source and is a coefficient for changing the correction value C(t) to a small value. In addition, the second coefficient r2 is a coefficient corresponding to the increase characteristics of the temperature of the light source and is a coefficient for changing the correction value C(t) to a large value.

The correction value acquisition portion 176 selects one of the first coefficient r1 and the second coefficient r2 based on the set light amount K(t) that is acquired by the light amount acquisition port ion 175 and obtains the correction value C(t) using the first coefficient r1 or the second coefficient r2 that is selected. More specifically, the correction value acquisition portion 176 changes a correction value C(t−1) of a previous time that is already obtained using the first coefficient r1 or the second coefficient r2 and calculates the current correction value C(t). The correction value C(t−1) corresponds to the "correction value that is obtained already" according to the invention.

In the embodiment, as the first coefficient r1, r1=−(1−0.8)/T2 is used. The first coefficient r1 is a coefficient for changing the correction value C(t) from the maximum value "1.0" to the minimum value "0.8" during a time T2 when the temperature of the light source portion 111 is sufficiently lowered. In addition, in the embodiment, as the second coefficient r2, r2=(1−0.8)/T1 is used. The second coefficient r2 is a coefficient for changing the correction value C(t) from the minimum value "0.8" to the maximum value "1.0" during the time T1 until the temperature of the light source becomes the equilibrium state from the state of being sufficiently lowered.

In the embodiment, an example in which as the first coefficient r1, "−(1−0.8)/T2" is used and as the second coefficient, "(1−0.8)/T1" is used is described, but these values are an example of values indicating a variation rate per unit time of the temperature of the light source and another value may be used. A coefficient to be used in the change in the correction value C(t) is not limited to two and may be one or may be three or more.

The correction value acquisition portion 176 uses a correction value C(0)=0.8 as a correction value that is initially set after the projector 100 is actuated.

In addition, the correction value acquisition portion 176 compares the set light amount K(t) that is acquired by the light amount acquisition portion 175 with a first threshold value Th1 and a second threshold value Th2, and determines a coefficient to be used in the change in the correction value C(t) when calculating the correction value C(t) of a second time and subsequent thereof. The first threshold value Th1 is smaller than the second threshold value. The correction value acquisition portion 176 selects the first coefficient r1 or the second coefficient r2 based on a comparison result and corrects the correction value C(t−1) of the previous time using the selected coefficient.

The correction value acquisition portion 176 adds the first coefficient r1 to the correction value C(t−1) of the previous time and calculates the current correction value C(t) in a state where the set light amount K(t) that is acquired by the light amount acquisition portion 175 is equal to or less than the first threshold value Th1. In a case where the set light amount K(t) is equal to or less than the first threshold value Th1, a calculation formula is indicated by the following formula (4).

$$C(t)=C(t-1)+r1=C(t-1)-(1-0.8)/T2 \quad (4)$$

In a case where the set light amount K(t) is equal to or less than the first threshold value Th1, since the output amount of light of the light source is small, the temperature of the light source portion 111 is lowered. In a case where the temperature of the light source portion 111 is lowered, as indicated in the temperature characteristics of the light source of FIG. 6, the output amount of light of the light source is increased. Therefore, the correction value acquisition portion 176 adds the first coefficient r1 to the correction value C(t−1) of the previous time and changes the correction value C(t) to a value smaller than the correction value C(t−1).

In addition, the correction value acquisition portion 176 causes the correction value C(t−1) of the previous time to be the current correction value C(t) without correction in a case where the set light amount K(t) that is acquired by the light amount acquisition portion 175 is greater than the first threshold value Th1 and is smaller than the second threshold value Th2. In a case where the set light amount K(t) is greater than the first threshold value Th1 and is smaller than the second threshold value Th2, a calculation formula is indicated by the following formula (5).

$$C(t)=C(t-1) \quad (5)$$

In addition, the correction value acquisition portion 176 adds the second coefficient r2 to the correction value C(t−1) of the previous time and calculates the current correction value C(t) in a case where the set light amount K(t) that is acquired by the light amount acquisition portion 175 is equal to or greater than the second threshold value Th2. In a case where the set light amount K(t) is equal to or greater than the second threshold value Th2, a calculation formula is indicated by the following formula (6).

$$C(t)=C(t-1)+r2=C(t-1)+(1-0.8)/T1 \quad (6)$$

In a case where the set light amount K(t) is equal to or greater than the second threshold value Th2, since the output light amount of the light source is great, the temperature of the light source portion 111 is increased. In a case where the temperature of the light source portion 111 is increased, the output amount of light of the light source is lowered. Therefore, the correction value acquisition portion 176 adds the second coefficient r2 to the correction value C(t−1) of the previous time and changes the correction value C(t) to a value that is greater than the correction value C(t−1).

In addition, the correction value acquisition portion 176 sets the correction value C(t) to 0.8 in a case where the calculated correction value C(t) is equal to or less than 0.8. Furthermore, the correction value acquisition portion 176 sets the correction value C(t) to 1.0 in a case where the calculated correction value C(t) is equal to or greater than 1.0.

The correction value acquisition portion 176 outputs the calculated correction value C(t) to the light amount correction processing portion 177.

The set light amount K(t) is input from the light amount acquisition port ion 175 into the light amount correction processing portion 177 and the correction value C(t) is input from the correction value acquisition portion 176. The light amount correction processing portion 177 corresponds to the "correction portion" according to the invention.

The light amount correction processing portion 177 integrates the set light amount K(t) and the correction value C(t) that are input and corrects the set light amount K(t) (step S7). The set amount of light after the correction is written as K'(t).

$$K'(t)=K(t) \times C(t) \qquad (7)$$

The light amount correction processing portion 177 outputs the corrected set light amount K'(t) to the light source control portion 172. The light source control portion 172 generates a control signal for controlling the light source drive portion 121 based on the set light amount K'(t) that is input from the light amount correction processing portion 177 and outputs the generated control signal to the light source drive portion 121. The light source drive portion 121 generates a PWM signal having a pulse for turning on the light source according to the input control signal and executes dimming of the light source by driving the light source of the light source portion 111 (step S8).

As described above, in the first embodiment to which the projector and the light source control method according to the invention are applied, the temperature variation of the light source is predicted by the set light amount K(t) that is calculated based on the image feature amount and the correction value acquisition portion 176 acquires the correction value C(t) corresponding to the predicted temperature variation of the light source. Therefore, the set light amount K(t) is corrected by using the correction value C(t) that is acquired by the light amount correction processing portion 177. Therefore, it is possible to appropriately control the amount of light that is output by the projector 100 in response to the influences of the temperature characteristics of the light source and the like.

In addition, the correction value C(t) that is acquired by the correction value acquisition portion 176 is a correction value in response to the temperature characteristics indicating the variation in the output amount of light of the light source with respect to the temperature variation of the light source. Therefore, it is possible to reduce the influences of the temperature characteristics of the light source and the like, and to appropriately control the amount of light that is output by the projector.

In addition, the correction value acquisition portion 176 uses the first coefficient r1 "−(1−0.8)/T2" for changing the correction value C(t) to a small value and the second coefficient r2 "(1−0.8)/T1" for changing the correction value C(t) to a great value as the coefficients for obtaining the correction value. The correction value acquisition portion 176 selects one of the first coefficient r1 or the second coefficient r2 based on the set light amount K(t), changes the correction value C(t−1) of the previous time that is obtained by using the first coefficient r1 or the second coefficient r2 that is selected, and obtains the correction value C(t).

Therefore, it is possible to select the coefficient for changing the correction value C(t) based on the set light amount K(t) that is acquired by the light amount acquisition portion 175. Therefore, it is possible to be corrected to an appropriate correction value C(t) according to the set light amount K(t). In addition, the correction value C(t−1) of the previous time that is obtained is changed by the first coefficient r1 or the second coefficient r2, and the current correction value C(t) is acquired. Therefore, it is possible to cause the correction value C(t) to gradually vary. Therefore, a rapid variation of the correction value C(t) is suppressed and the brightness of the displayed image can be prevented from being rapidly varied.

The correction value acquisition portion 176 selects the correction value C(t−1) of the previous time that is obtained as the correction value C(t) for correcting the set light amount K(t) in a case where the set light amount K(t) is greater than the first threshold value Th1 and is smaller than the second threshold value Th2. In addition, the correction value acquisition portion 176 obtains the correction value C(t) by applying the first coefficient to the correction value C(t−1) of the previous time that is obtained in a case where the set light amount K(t) is equal to or less than the first threshold value Th1. Furthermore, the correction value acquisition portion 176 obtains the correction value C(t) by applying the second coefficient to the correction value C(t−1) of the previous time that is obtained in a case where the set light amount K(t) is equal to or greater than the second threshold value Th2.

Therefore, it is possible to suppress the rapid variation in the brightness of the image by selecting an appropriate value as the correction value.

In addition, the first coefficient r1 that is used for correcting the correction value C(t) by the correction value acquisition portion 176 is a coefficient corresponding to the decrease characteristics of the temperature of the light source and the second coefficient r2 is a coefficient corresponding to the increase characteristics of the temperature of the light source. Therefore, it is possible to correct the set light amount K(t) that is acquired by the light amount acquisition portion 175 by the coefficient corresponding to the increase characteristics or the decrease characteristics of the temperature of the light source.

Second Embodiment

A projector 100 of a second embodiment will be described. Since the projector 100 of the second embodiment has the same configuration as that of the first embodiment, the description of the configuration of the second embodiment will be omitted.

A correction value acquisition portion 176 of the second embodiment uses a value that is set in advance as a correction value C(t) without calculation of the correction value C(t) in a case where predetermined conditions are satisfied. For example, if a light source portion 111 is turned off, a temperature of a light source is rapidly lowered and the correction value C(t) that is changed by the correction value acquisition portion 176 may not follow the temperature variation in the light source. In this case, if a light amount that applies a load to the light source is set, it becomes a cause of failure of the light source.

Therefore, in a case where the set light amount K(t) that is acquired by the light amount acquisition portion 175 is "0" as the predetermined conditions, the correction value acquisition portion 176 of the second embodiment selects "0.8" (minimum value) that is a value set in advance as the correction value C(t) and outputs the value to the light amount correction processing portion 177. The correction value acquisition portion 176 is operated as described above and thereby the correction value C(t) can correspond to the temperature variation in the light source even if the temperature of the light source is rapidly varied. Therefore, it is possible to prevent failure of the light source and the like.

Third Embodiment

A projector 100 of a third embodiment will be described. Since the projector 100 of the third embodiment has the same configuration as that of the first embodiment, the description of the configuration of the third embodiment will be omitted.

A black image is inserted between images and an image in which an image after insertion of the black image is gradually bright is included in an image displayed by the projector 100. The black image inserted between the images is inserted in a very short period of time. Therefore, an influence on the temperature characteristics of the light source is small. Therefore, it is not necessary to correct an output amount of light of the light source based on a luminance of only the black image.

Therefore, the correction value acquisition portion 176 of the third embodiment does not obtain the correction value C(t) using the set light amount K(t) that is input from the light amount acquisition portion 175 as it is and calculates an average value of the set light amount K(t) that is input from the light amount acquisition portion 175. The average value of the calculated set light amount K(t) is written as Kavg(t).

The correction value acquisition portion 176 compares the calculated average value Kavg(t) with a first threshold value and a second threshold value, and selects a coefficient (first coefficient r1 or the second coefficient r2) for changing the correction value C(t−1) of the previous time. Since the following operations are the same as those of the first embodiment, the description will be omitted.

As described above, in the third embodiment, the average value Kavg(t) of the set light amount K(t) is calculated, the calculated average value Kavg(t) of the set light amount K(t) is corrected by the first coefficient r1 or the second coefficient r2, and the set light amount K(t) is obtained. Therefore, in a case where the black image is inserted between images, a variation in a correction value by an instantaneous variation of an image is reduced and it is possible to reduce the variation of the amount of light of the light source.

The first to third embodiments described above are appropriate embodiments of the invention. However, the invention is not limited to these embodiments and various modifications can be implemented within the scope not departing from the gist of the invention.

For example, in the first to third embodiments described above, a case where the correction value acquisition portion 176 calculates the correction value C(t) for correcting the set light amount K(t) is described. As another method for calculating the correction value C(t), a configuration, in which the LUT in which the correction value C(t) corresponding to the set light amount K(t) is registered is stored in the storage portion 160 and the correction value acquisition portion 176 obtains the correction value C(t) corresponding to the set light amount K(t) from the LUT, may be provided. The correction value acquisition portion 176 eliminates the need to calculate the correction value C(t) and it is possible to reduce a processing load.

In addition, in the first to third embodiments described above, the light source, which indicates the temperature characteristics in which the output amount of light is increased in a case where the temperature of the light source portion 111 is lowered, is described as an example. The light source to which the invention is capable of applying is not limited to the temperature characteristics and, for example, the invention may apply to a light source indicating temperature characteristics in which the output amount of light is lowered in a case where the temperature of the light source portion 111 is increased.

In addition, in the first to third embodiments described above, a case where the light source is the solid-state light source as an example, but the light source is not limited to the solid-state light source and may be a xenon lamp or an ultra-high pressure mercury lamp.

In addition, in the first to third embodiments described above, the correction value acquisition portion 176 compares the set light amount K(t) with the first threshold value Th1 and the second threshold value Th2, and a coefficient to be used for changing the correction value C(t) is determined. In addition, the correction value acquisition portion 176 compares the set light amount K(t) with one threshold value and may determine the coefficient to be used for changing the correction value C(t). For example, in a case where the set light amount K(t) is equal to or less than the threshold value, the correction value acquisition portion 176 corrects the set light amount K(t) using the second coefficient r2 and in a case where the set light amount K(t) is greater than the threshold value, the correction value acquisition portion 176 may correct the set light amount K(t) using the first coefficient r1.

In addition, the LUT to be used for acquiring the extension rate or the amount of light is not limited to the LUT illustrated in FIG. 5. That is, the 2D-LUT having a plot corresponding to the APL and the peak value is exemplified in FIG. 5, but it is possible to use an LUT in which the extension rate or the amount of light is set in response to the APL, the peak value, the luminance histogram, or other feature amounts.

Furthermore, the projector 100 is not limited to the configuration in which the feature amount acquisition portion 173 calculates the feature amount for all the frames of the image data D2 and obtains the extension rate or the amount of light. For example, an average value of the image feature amount that is obtained by the feature amount acquisition portion 173 is obtained for a plurality of frames and the extension rate or the amount of light may be obtained based on the average value, and in addition, a specific processing method can be arbitrary changed.

In addition, in the embodiments described above, a configuration, in which three transmissive type liquid crystal panels are used in response to each color of RGB is used as the light modulation device 112 for modulating the light emitted by the light source, is described as an example, but the invention is not limited to the example. For example, a configuration, in which three reflective type liquid crystal panels are used, may be provided, or a system that is obtained by combining one liquid crystal panel and a color wheel may also be used. Otherwise, a configuration, which is provided by a system using three digital mirror devices (DMD), a DMD system that is obtained by combining one digital mirror device and a color wheel, and the like, may be provided. In a case where only one liquid crystal panel or the DMD is used as the light modulation device, a member corresponding to a combined optical system such as a cross dichroic prism is not necessary. In addition, it is possible to employ another device other than the liquid crystal panel and the DMD without any problem as long as the light modulation device is capable of modulating the light emitted by the light source.

In addition, in the embodiments described above, as the projector 100, the front projection type projector 100 that projects an image from the front of the screen SC is illustrated, but the invention is not limited to the example. For example, it is possible to employ a rear projection (rear surface projection) type projector that projects an image from a rear surface side of the screen SC as a display device.

In addition, each functional portion illustrated in FIGS. 1 and 2 illustrates a functional configuration, but a specific embodiment is not specifically limited. That is, individually corresponding hardware is not necessarily mounted on each functional portion. Of course, one processor executes a program and thereby functions of a plurality of functional configurations may be implemented. In addition, in the embodiments described above, a part of the functions that are implemented by software may be implemented in hardware, or a part of the functions that are implemented by hardware may be implemented in software. In addition, specific detailed configurations of another portion of the projector 100 may also be arbitrary changed within a range without departing from the scope of the invention.

What is claimed is:

1. A projector comprising:
a light source;
a light source control portion that controls an amount of light emitted by the light source;
an input portion which image data is input into;
an amount of light acquisition portion that acquires a set amount of light of the light source based on a feature amount of the image data input into the input portion;
a correction value acquisition portion that acquires a correction value based on the set amount of light; and
a correction portion that corrects the set amount of light using the correction value acquired by the correction value acquisition portion,
wherein the light source control portion controls the amount of light of the light source based on the set amount of light that is corrected by the correction portion,
wherein the correction value acquisition portion has a first coefficient for changing the correction value to a small value and a second coefficient for changing the correction value to a large value as coefficients for obtaining the correction value, and
wherein one of the first coefficient or the second coefficient is selected based on the set amount of light and the correction value is obtained using the selected first coefficient or second coefficient.

2. The projector according to claim 1,
wherein the correction value acquisition portion obtains the correction value corresponding to a temperature of the light source and characteristics of an output amount of light.

3. The projector according to claim 1,
wherein the correction value acquisition portion applies the first coefficient to the correction value that is already obtained by the correction value acquisition portion and then obtains a correction value in a case where the set amount of light is equal to or less than a first threshold value, and applies the second coefficient to the correction value that is already obtained by the correction value acquisition portion and then obtains a correction value in a case where the set amount of light is equal to or greater than a second threshold value.

4. The projector according to claim 3,
wherein the correction value acquisition portion selects the correction value that is already obtained by the correction value acquisition portion as the correction value for correcting the set amount of light in a case where the set amount of light is greater than the first threshold value and less than the second threshold value.

5. The projector according to claim 1,
wherein the first coefficient is a coefficient corresponding to decrease characteristics of the temperature of the light source and the second coefficient is a coefficient corresponding to increase characteristics of the temperature of the light source.

6. The projector according to claim 1,
wherein the correction value acquisition portion changes the correction value to a value that is set in advance in a case where predetermined conditions are satisfied.

7. The projector according to claim 1,
wherein the correction value acquisition portion obtains the correction value based on an average value of the set amount of light.

8. A projector comprising:
a light source;
a light source control portion that controls an amount of light emitted by the light source;
an input portion which image data is input into;
an amount of light acquisition portion that acquires a set amount of light of the light source based on a feature amount of the image data input into the input portion;
a correction value acquisition portion that acquires a correction value based on the set amount of light;
a correction portion that corrects the set amount of light using the correction value acquired by the correction value acquisition portion;
an extension rate calculation portion that calculates an extension rate to be used for luminance extension processing that changes a luminance range of image data based on the characteristic amount of the image data input into the input portion, and
an extension processing portion that performs the luminance extension processing with respect to the image data using the extension rate that is calculated by the extension rate calculation portion,
wherein the light source control portion controls the amount of light of the light source based on the set amount of light that is corrected by the correction portion.

9. The projector according to claim 1, further comprising:
a storage portion that stores the correction value,
wherein the correction value acquisition portion acquires the correction value corresponding to the set amount of light from the storage portion.

10. A light source control method for controlling an amount of light of a light source provided in a projector, the method comprising:
acquiring a set amount of light of the light source based on a characteristic amount of input image data;
acquiring a correction value based on the set amount of light;
correcting the set amount of light by using the correction value; and
controlling an amount of light of the light source based on the corrected set amount of light,
wherein as coefficients for obtaining the correction value, a first coefficient for changing the correction value to a small value and a second coefficient for changing the correction value to a large value are provided, and wherein one of the first coefficient and the second coefficient is selected based on the set amount of light, and the correction value is obtained using the selected first coefficient or second coefficient.

11. The light source control method according to claim 10, wherein the correction value is a correction value corresponding to the temperature of the light source and characteristics of the output amount of light.

12. The light source control method according to claim 10, wherein the first coefficient is applied to the correction value that is already obtained and then a correction value is obtained in a case where the set amount of light is equal to or less than a first threshold value, and the second coefficient is applied to the correction value that is already obtained and then a correction value is obtained in a case where the set amount of light is equal to or greater than a second threshold value.

13. The light source control method according to claim 12, wherein the correction value that is already obtained is selected as the correction value for correcting the set amount of light in a case where the set amount of light is greater than the first threshold value and less than the second threshold value.

14. The light source control method according to claim 10, wherein the first coefficient is a coefficient corresponding to decrease characteristics of the temperature of the light source and the second coefficient is a coefficient corresponding to increase characteristics of the temperature of the light source.

15. The light source control method according to claim 10, wherein the correction value is changed to a value that is set in advance in a case where predetermined conditions are satisfied.

16. The light source control method according to claim 10, wherein the correction value is obtained based on an average value of the set amount of light.

* * * * *